R. W. OSWALD.
FAN WHEEL.
APPLICATION FILED JULY 13, 1921.

1,423,964.

Patented July 25, 1922.
2 SHEETS—SHEET 1.

Inventor,
R. W. Oswald.

By
Attorney

UNITED STATES PATENT OFFICE.

RICHARD W. OSWALD, OF PITTSBURGH, PENNSYLVANIA.

FAN WHEEL.

1,423,964.  Specification of Letters Patent.  Patented July 25, 1922.

Application filed July 13, 1921. Serial No. 484,475.

*To all whom it may concern:*

Be it known that I, RICHARD W. OSWALD, a citizen of the United States, residing at Pittsburgh, in the county of Allegheny and State of Pennsylvania, have invented a new and useful Fan Wheel, of which the following is a specification.

This invention aims to provide a fan wheel which may be made simply and at trifling expense, out of disks, by simply slitting and bending the disks and securing them together.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

Figures 1, 2:
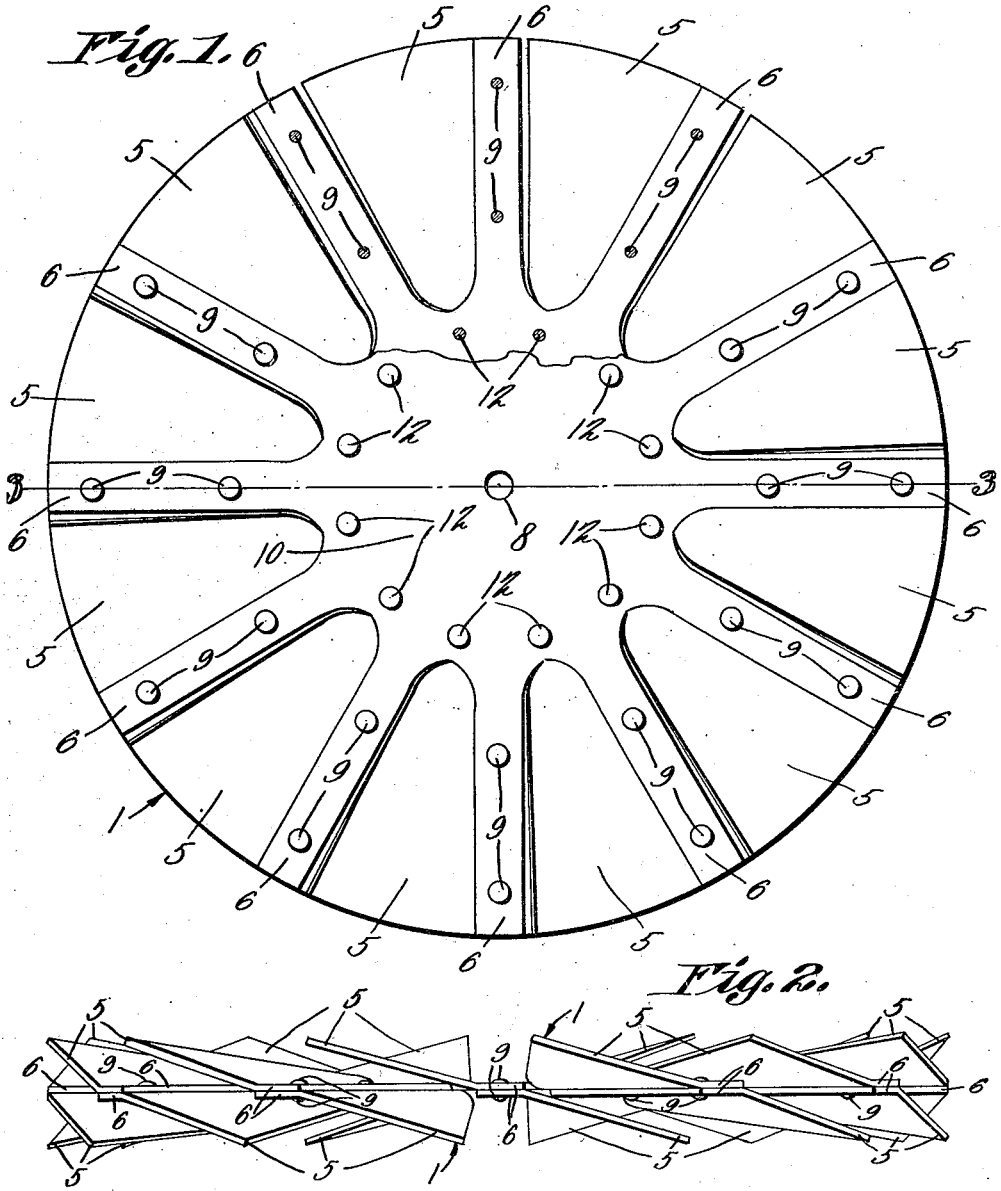
Figure 3:
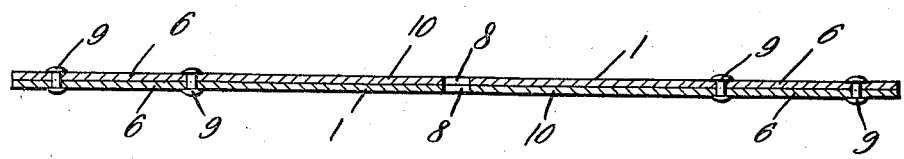
Figure 4:
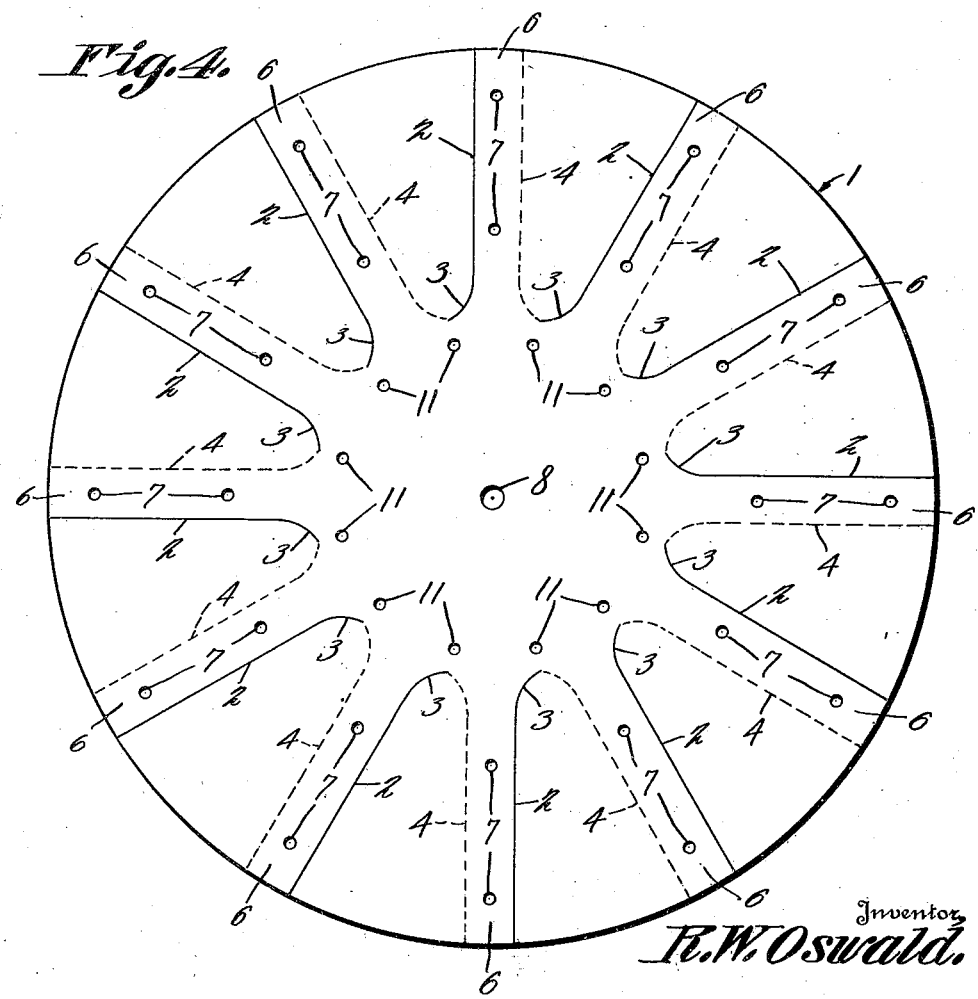

In the accompanying drawings:

Figure 1 shows in side elevation, a fan wheel constructed in accordance with the invention, parts being broken away; Figure 2 is an elevation wherein the fan wheel is viewed edgewise; Figure 3 is a section on the line 3—3 of Figure 1; Figure 4 is a plan of the blank out of which the members of the wheel are made.

The fan wheel forming the subject matter of this application preferably is made out of disks 1, ordinarily of metal. Each disk 1 is provided with radial slits 3 extended inwardly from its periphery, and prolonged in a circumferential direction at their inner ends, as shown at 3. The material thus freed is bent outwardly on a line indicated at 4 to form blades 5, arms 6 carrying the blades, and a hub 10 from which the arms project. The arms 6 have openings 7, and the hub 10 has a central opening 8. Openings 11 may be formed in the hub 10.

The disks 1 are reversed with respect to each other, so that the blades 5 of one disk project, circumferentially of the wheel, in a direction opposite to the blades 5 of the other disk, as shown in Figure 2, the disks being placed together, the arms 6 of the disks being in alinement, the openings 7 registering with each other, the openings 8 registering with each other, and the openings 11 registering with each other, in the disks. Securing elements 9 are mounted in the openings 7, securing elements 12 being mounted in the openings 11, to hold the disks together. The openings 8 in the disks are alined, and are adapted to receive a shaft or the like.

It is obvious that the device forming the subject matter of this application can be made simply out of disks, by a simple cutting operation supplemented by an equally simple fastening or connecting operation of any desired sort.

I claim:—

1. A fan wheel comprising like disks provided with arms and with blades projecting from the arms, the disks being placed together, to bring the arms into alinement; and means for connecting the disks.

2. A fan wheel comprising disks provided with arms and having blades extended from the arms, the disks being reversed with respect to each other and being placed together, to bring the arms into engagement with each other, and to bring the blades of the respective disks opposite to each other; and means for connecting the disks.

3. A fan wheel comprising disks having radial slits, the material freed by the slits being outwardly inclined to form arms and blades projecting from the arm, the disks being placed one against the other; and means for connecting the disks.

4. A method of making a fan wheel, which consists in slitting a pair of disks to free a portion of the constituent material of the disks, bending the material outwardly to form blades; reversing one disk with respect to each other, placing the disks together, and connecting the disks.

In testimony that I claim the foregoing as my own, I have hereto affixed my signature in the presence of two witnesses.

RICHARD W. OSWALD.

Witnesses:
 FRANK H. CZARNIECKI,
 F. M. SEIDENER.